(12) United States Patent
Nishihara et al.

(10) Patent No.: US 8,590,481 B2
(45) Date of Patent: Nov. 26, 2013

(54) DIPPING APPARATUS FOR TREATMENT OF A WORKPIECE ON A CONVEYING TRAVELING BODY

(75) Inventors: Shigeyoshi Nishihara, Shiga (JP); Takashi Fukuda, Osaka (JP); Hirohito Takeichi, Shiga (JP); Hirofumi Fujisaki, Shiga (JP)

(73) Assignee: Daifuku Co., Ltd., Osaka-shi, Osaka (JP)

( * ) Notice: Subject to any disclaimer, the term of this patent is extended or adjusted under 35 U.S.C. 154(b) by 193 days.

(21) Appl. No.: 13/177,767

(22) Filed: Jul. 7, 2011

(65) Prior Publication Data
US 2012/0006260 A1    Jan. 12, 2012

(30) Foreign Application Priority Data
Jul. 8, 2010 (JP) .................................. 2010-155439

(51) Int. Cl.
| | | |
|---|---|---|
| B05C 3/00 | (2006.01) | |
| B05C 19/02 | (2006.01) | |
| B65G 43/00 | (2006.01) | |
| B65G 43/08 | (2006.01) | |
| B65G 49/02 | (2006.01) | |
| B65G 1/00 | (2006.01) | |

(52) U.S. Cl.
USPC ........ 118/423; 118/425; 118/426; 198/346.1; 198/346.2; 198/347.2; 198/347.3

(58) Field of Classification Search
USPC ......... 118/423–426; 198/346.1, 346.2, 347.2, 198/347.3
See application file for complete search history.

(56) References Cited

U.S. PATENT DOCUMENTS

| | | | |
|---|---|---|---|
| 5,651,822 A | 7/1997 | Heckmann | |
| 5,725,669 A * | 3/1998 | Heckmann | ..................... 118/423 |
| 7,026,015 B2 * | 4/2006 | Kreuzer | ........................ 118/423 |

FOREIGN PATENT DOCUMENTS

JP    9510681 T    10/1997

\* cited by examiner

*Primary Examiner* — Dah-Wei Yuan
*Assistant Examiner* — Binu Thomas
(74) *Attorney, Agent, or Firm* — Dickinson Wright PLLC

(57) ABSTRACT

A dipping apparatus for dipping the workpiece W in a treatment bath. The workpiece is transferred while fixed on a conveying traveling body 2, and each one flipped upside down together into the treatment bath for carrying out a surface treatment of the workpiece W. The dipping apparatus is provided with a positioning and fixing device to position the conveying traveling body 2 onto the guide rail 17a on the rotation base 15 at a fixed position and to fix the conveying traveling body 2 to the rotation base 15. A feeding mechanism feeds the conveying traveling body 2 to the fixed position on the rotation base 15.

5 Claims, 13 Drawing Sheets

DIPPING APPARATUS FOR TREATMENT OF A WORKPIECE ON A CONVEYING TRAVELING BODY

CROSS REFERENCE TO RELATED APPLICATION

This utility patent application claims the priority of JP 2010-155439 filed on Jul. 8, 2010, entitled "Dipping Apparatus," the entire disclosure of the application being considered part of the disclosure of this application and hereby incorporated by reference.

TECHNICAL FIELD

The present invention relates to a dipping apparatus for flipping a workpiece having been conveyed while fixed on a conveying traveling body, upside down together with the conveying traveling body, dipping the workpiece in a treatment bath, and carrying out a surface treatment of the workpiece.

BACKGROUND OF THE INVENTION

This kind of dipping apparatus is known as a dipping apparatus for carrying out a surface treatment of a vehicle body of an automobile. More specifically, this kind of dipping apparatus includes a treatment bath into which a workpiece is dipped to treat a surface thereof, a horizontal spindle crossing above the treatment bath, a rotation base rotatably supported about the horizontal spindle, a driving mechanism to rotate the rotation base in forward and reverse directions between a waiting posture of being substantially horizontal above the treatment bath and a flipped posture of being rotated forwardly downward from the waiting posture and being upside down, traveling body guiding mechanism provided on the rotation base so as to travelably support and guide a conveying traveling body along a back and forth direction orthogonal to the horizontal spindle, wherein the conveying traveling body on which the workpiece is loaded and fixed can be transferred from a ground traveling path onto the traveling body guiding mechanism of the rotation base in the waiting posture, as described in Japanese Patent No. 3638283. In the configuration as described in Japanese Patent No. 3638283, a pallet without wheels is used as the conveying traveling body and roller conveyors slidably supporting the pallet are used as the ground traveling path and the traveling body guiding mechanism on the rotation base.

SUMMARY OF THE INVENTION

In the conventional dipping apparatus as described in the above Japanese Patent No. 3638283, the treatment bath is arranged below the traveling path of the conveying traveling body (pallet) along the path. The conveying traveling body is made to move onto the rotation base in the waiting posture from the rear end of the rotation base and positioned and fixed. In this state, the rotation base is rotated. The workpiece is turned upside down together with the conveying traveling body and dipped in the treatment bath. The rotation base is returned to the waiting posture, and then the conveying traveling body is moved forward and advanced onto the ground traveling path from the front end of the rotation base.

In such a dipping apparatus, the conveying traveling body is made to pass and travel with respect to the treatment bath, as described in Japanese Patent No. 3638283 as well, when the rotation base, positioned immediately below the center of an entire length of the workpiece (vehicle body), is rotated about a horizontal spindle arranged near the front end thereof to shorten a required front-back direction length for the treatment bath. The rotation base while rotating largely projects forward with respect to the horizontal spindle. As a result, measures such that the ground traveling path connected to the front end of the rotation base, more specifically, guide rails and roller conveyors are allowed to escape laterally during rotation of the rotation base are required so that the ground traveling path connected to the front end of the rotation base does not interfere with the rotation base. This leads to considerable equipment costs. Further, a positioning and fixing device to fix the conveying traveling body (pallet) to a fixed position on the rotation base is essential. In the configuration where the conveying traveling body passes through as described above, however, the positioning and fixing device needs to switch the conveying traveling body having moved from the rear side from a state of being positionally fixed with respect to the back and forth direction to a state of being capable of advancing forward. A fixed stopper simply receiving the conveying traveling body at a fixed position cannot be used. Accordingly, the costs become high regarding the positioning and fixing device, too.

The present invention proposes a dipping apparatus capable of solving the above-described conventional problems. A dipping apparatus according to the first aspect of the present invention, described with reference symbols in parentheses used in the description of embodiments described below in order to facilitate understanding the relationship with the embodiments, includes a treatment bath (1) into which a workpiece (W) is dipped to treat a surface thereof, a horizontal spindle (16) crossing above the treatment bath (1), a rotation base (15) rotatably supported about the horizontal spindle (16), a driving mechanism (21) to rotate the rotation base (15) in forward and reverse directions between a waiting posture of being substantially horizontal above the treatment bath (1) and a flipped posture of being rotated forwardly downward from the waiting posture and being upside down, traveling body guiding mechanism (17a and 17b) provided on the rotation base (15) so as to travelably support and guide the conveying traveling body (2) along a back and forth direction orthogonal to the horizontal spindle (16), a ground traveling path (3) from which the conveying traveling body (2) on which the workpiece (W) is loaded and fixed can be transferred onto the traveling body guiding mechanism (17a and 17b) of the rotation base (15) in the waiting posture, the ground traveling path (3) serving as both an approach path and a retreat path of the conveying traveling body (2) with respect to the rotation base (15) and connected with the traveling body guiding mechanism (17a and 17b) only at a rear end of the rotation base (15) in the waiting posture, positioning and fixing device (43) to position the conveying traveling body (2) having been transferred from the rear end of the rotation base (15) onto the rotation base (15) via the traveling body guiding mechanism (17a and 17b) at a fixed position and fix the conveying traveling body (2) to the rotation base (15), feeding mechanism (26a and 26b) to feed the conveying traveling body (2) to the fixed position on the rotation base (15) positioned by the positioning and fixing device (43), and operation mechanism (54a and 54b) to switch the positioning and fixing device (43) between a fixation released state and a fixation active state.

When the above-described present invention is carried out, specifically as set forth in the second aspect, the rotation base (15) can be supported at a position nearer to a front end thereof than a central position in the back and forth direction thereof by the horizontal spindle (16), and support mechanism (38) to receive the rear end of the rotation base (15) in the waiting posture can be arranged. In that case, as set forth in the third aspect, the rotation base (15) can be composed of a pair of left and right front-back direction frame materials (18a and 18b), the traveling body guiding mechanism on the rotation base (15) can be composed of a pair of left and right guide rails (17a and 17b) which are laid on the front-back direction frame materials (18a and 18b) constituting the rotation base (15) and support wheels (5a to 6b) of the conveying traveling body (2), and the support mechanism (38) can be composed of a pair of left and right positioning guides (39a and 39b) to which rear ends of the pair of left and right front-back direction frame materials (18a and 18b) are fitted and receivers (40a and 40b) to receive the rear ends of the front-back direction frame materials (18a and 18b).

Further, as set forth in the fourth aspect, the conveying traveling body (2) has a bottom installed with at least front and rear pairs of horizontal left-right direction engaged pins (11a to 12b), the positioning and fixing device (43) can be composed of at least front and rear pairs of positioning members (44a to 44d) having lateral depressed portions (46) to which the respective engaged pins (11a to 12b) of the conveying traveling body (2) having moved onto the rotation base (15) are fitted horizontally and a locking movable piece (48) being switchable between a fixation active state for preventing retracting movement of the conveying traveling body (2) whose engaged pins (11a to 12b) are fitted inside the respective lateral depressed portions (46) of the positioning members (44a to 44d) and a fixation released state of allowing the retracting movement of the conveying traveling body (2). In that case, as set forth in the fifth aspect, the locking movable piece (48) of the positioning and fixing device (43) can pivotally be supported at the rotation base (15) so as to be swingingly engaged with and detached from a locked member (10a or 10b) provided to the conveying traveling body (2) and can be juxtaposed with a spring (53) for holding this locking movable piece (48) in a fixation active state of being engaged with the locked member (10a or 10b) and in a fixation released state of being detached from the locked member (10a or 10b). It is noted that a lock mechanism having the locking movable piece (48) can be provided as a left and right pair as in the embodiments described below, but also can be provided only on either left or right side depending on the circumstances.

Furthermore, as set forth in the sixth aspect, the operation mechanism (54a or 54b) can be composed of a first operating piece (55) forcibly swinging the locking movable piece (48) from the fixation released state to the fixation active state, a driving actuator (56) for the first operating piece (55), a second operating piece (57) forcibly swinging the locking movable piece (48) from the fixation active state to the fixation released state, and a driving actuator (58) for the second operating piece (57).

Further, when the configuration as described in the fourth aspect is adopted, as set forth in the seventh aspect, the locking movable piece (63) of the positioning and fixing device (43) can pivotally be supported at the rotation base (15) so as to be swingingly engaged with and detached from a locked member (10a or 10b) provided to the conveying traveling body (2), can be provided with an operated portion (63b) and be juxtaposed with a spring (75) for biasingly holding the locking movable piece (63) in a fixation active state of being engaged with the locked member (10a or 10b), and the operation mechanism (64) can be composed of a positionally fixed operation member (82) acting upon the operated portion (63b) of the locking movable piece (63) when the rotation base (15) returns to the waiting posture and moving the locking movable piece (63) to a fixation released state of being away from a moving path of the locked member (10a or 10b) against a biasing force of the spring (75).

According to the configuration as set forth in the first aspect of the present invention, the ground traveling path which is connected to the rear end of the rotation base in the waiting posture serves as both an approach path and a retreat path of the conveying traveling body with respect to the rotation base, and the workpiece loaded conveying traveling body whose dipping in the treatment bath is completed by rotation of the rotation base retracts from on the rotation base in the waiting posture and returns to the initial ground traveling path. Since the ground traveling path to make the conveying traveling body leave is not provided at the front end of the rotation base, there is no need to adopt such a complex configuration that guide rails or roller conveyors constituting the retract ground traveling path are allowed to escape to lateral both sides as in the conventional manner even if the rotation base is configured to pivotally be supported by the horizontal spindle at a position where the rear end thereof projects forward largely when rotated forwardly downward from the waiting posture, that is, at a position near the front end thereof. Consequently, the configuration of the entire apparatus can be rendered simple and be carried out inexpensively.

Further, a fixed stopper structure to receive the conveying traveling body having moved onto the rotation base in the waiting posture at a fixed position can be incorporated into the positioning and fixing device which is necessary for the rotation base. Therefore, the configuration of the positioning and fixing device becomes simple and can be carried out inexpensively in this respect, too.

On the other hand, according to the configuration as set forth in the second aspect, the front-back direction length of the treatment bath can be shortened as compared with the case where the rotation base is pivotally supported by the horizontal spindle at the central position in the back and forth direction of the rotation base (the central position in the back and forth direction of the workpiece such as vehicle body on the conveying traveling body having been positioned and fixed on the rotation base), as described above. At the same time, the rotation base can be supported in the waiting posture reliably and stable only by the support mechanism to receive the rear end of the rotation base. In that case, the configuration as set forth in the third aspect can make the receiver of the support mechanism efficiently receive loads of the workpiece loaded conveying traveling body which act upon the rotation base and also can prevent lateral swinging of the rotation base reliably, such that the conveying traveling body can be moved onto and leave the rotation base safely.

According to the configuration as set forth in the fourth aspect, the engaged pins provided at at least two places at the front and rear of the rotation base and the fixed positioning members corresponding to those engaged pins and provided at the rotation base can reliably exert both functions of stopping the conveying traveling body having moved onto the rotation base at a fixed position and of preventing dropping of the conveying traveling body when the rotation base is flipped upside down. Then, the positioning and fixing device to position and fix the conveying traveling body at a fixed position on the rotation base can be configured by a remarkably simple structure of adding as safety measures the locking movable piece which prevents the conveying traveling body from retracting. In that case, the retracting movement of the conveying traveling body on the rotation base can reliably be prevented by the locking movable piece according to the configuration as set forth in the fifth aspect. As long as the shape and pivotal support position of the locking movable piece is preconsidered such that the locking movable piece does not move toward the fixation released direction by an acting force acting thereon from the locked member of the conveying traveling body when a retracting force acts upon the conveying traveling body on the rotation base, safety can be enhanced by a simple structure of only adding a spring capable of holding the locking movable piece in the fixation active state and in the fixation released state.

Furthermore, according to the configuration as set forth in the sixth aspect, the locking movable piece held in the fixation active state or the fixation released state by the spring force as described above can be switched to the opposite state reliably by the two operating pieces and the driving actuators therefore. Further, according to the configuration as set forth in the seventh aspect, an actuator such as a cylinder unit as mechanism to switch the locking movable piece between the locking active state and the locking released state is unnecessary, and the positionally fixed operation member and the spring can switch the locking movable piece between the locking active state and the locking released state. Thus, the apparatus of the present invention can be carried out easily and inexpensively.

Further scope and applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
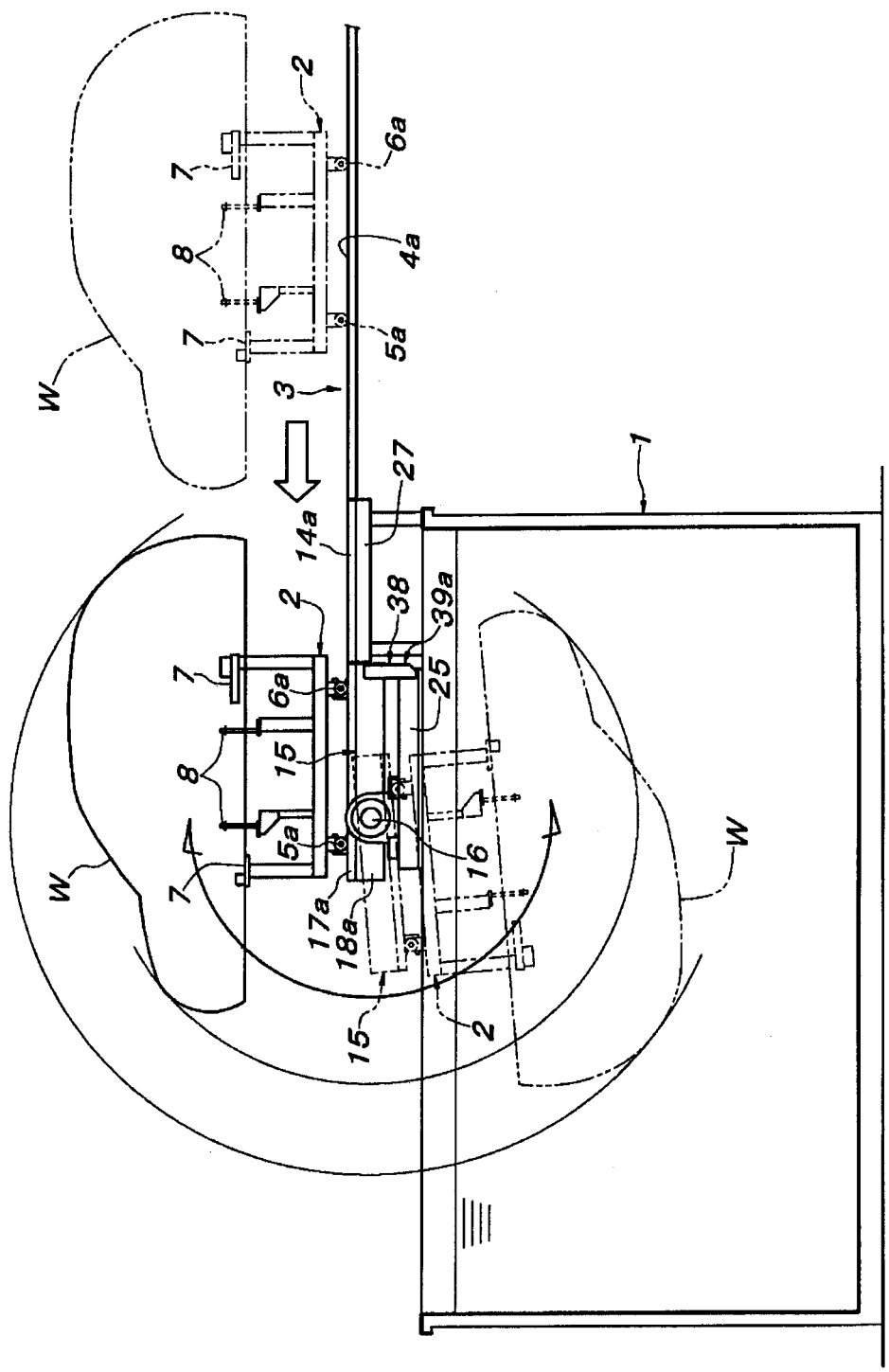
FIG. 1 is a partial longitudinal sectional side view of an entire apparatus.
Figure 2:
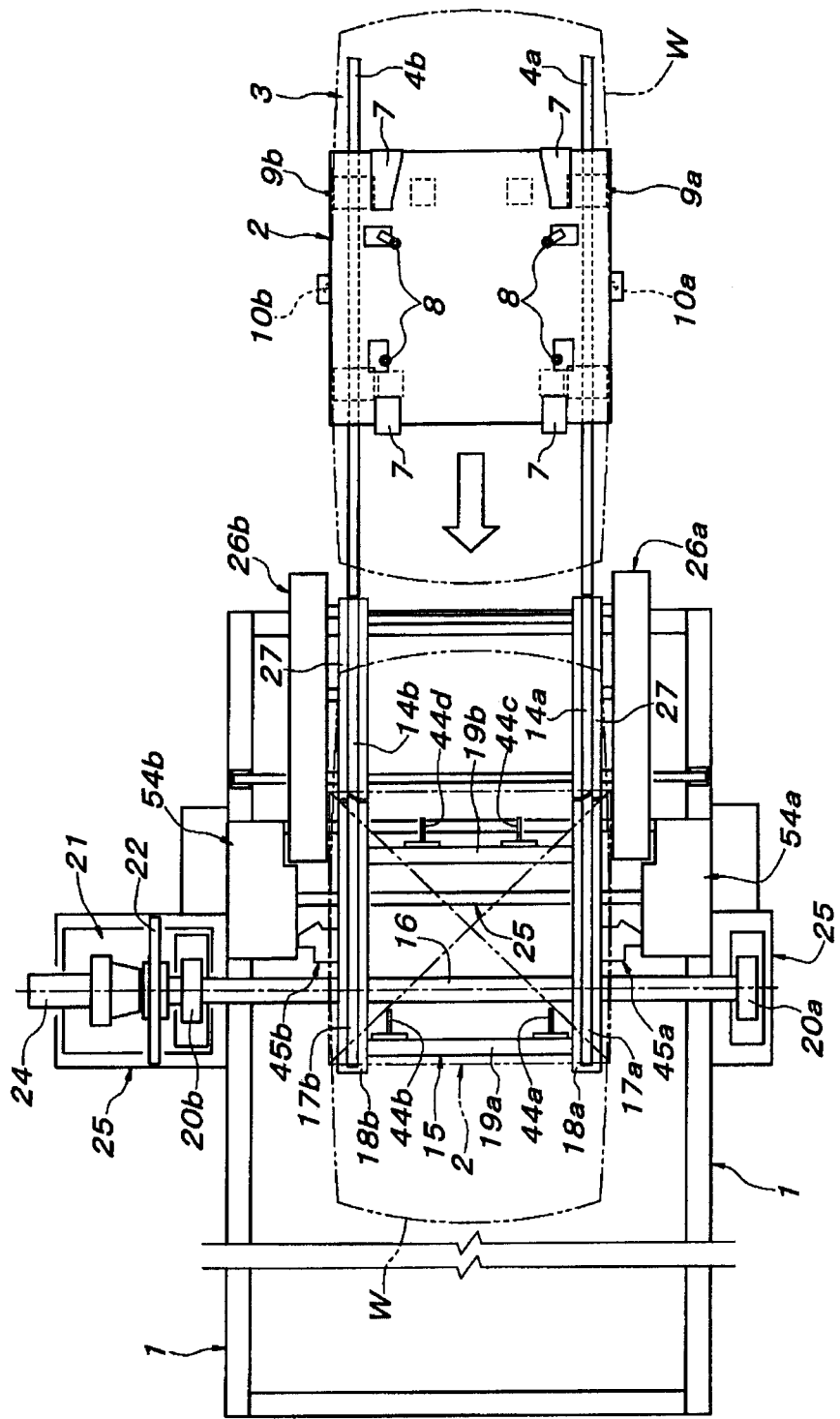
FIG. 2 is a plan view of the entire apparatus.
Figure 3:
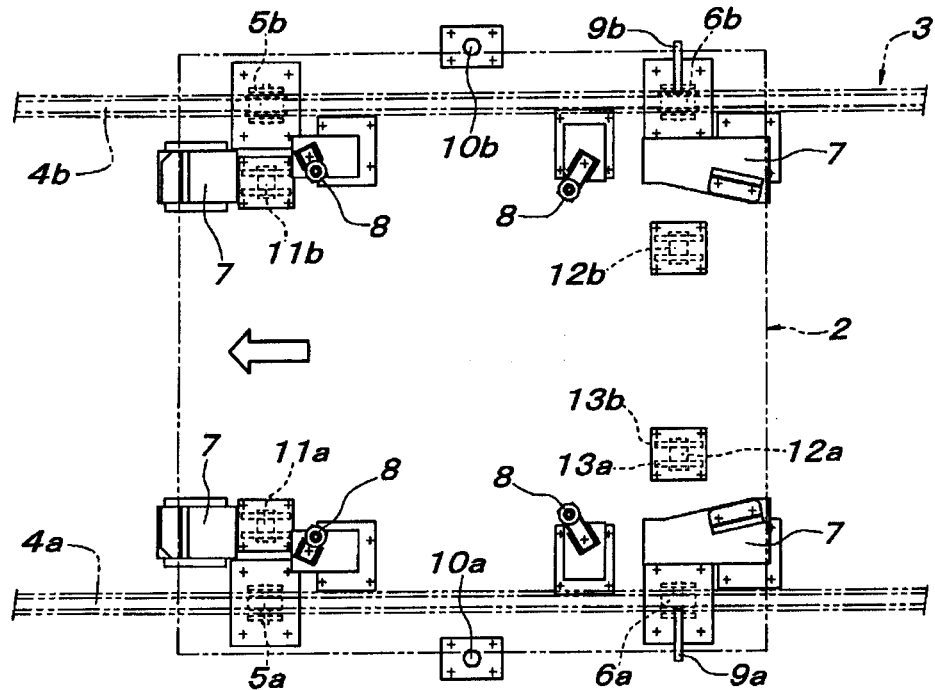
FIG. 3 is a plan view explaining a configuration of a conveying traveling body except for a traveling main body.
Figure 4:
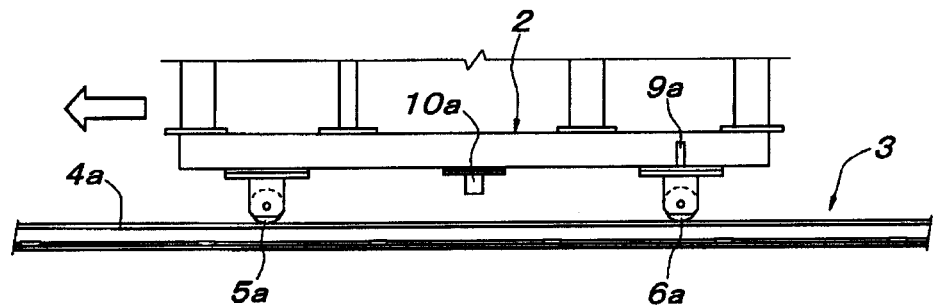
FIG. 4 is a side view of a main part of the conveying traveling body.
Figure 5:
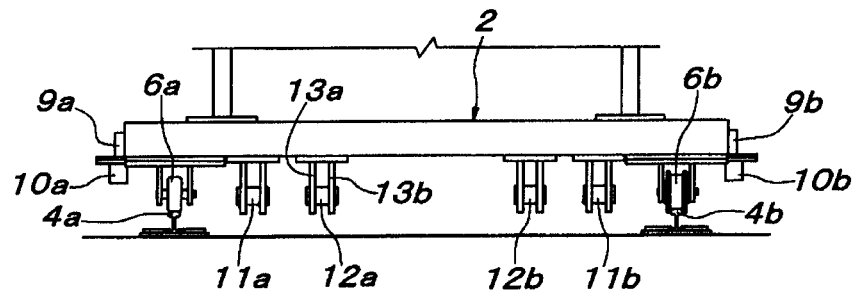
FIG. 5 is a rear view of the main part of the conveying traveling body.

In FIG. 1 and FIG. 2, reference symbol 1 denotes a treatment bath with a rectangular shape in a plan view and is placed at the end of a ground traveling path 3 of a conveying traveling body 2 in such a direction that longer sides thereof are in parallel with the traveling path 3. The ground traveling path 3 of the conveying traveling body 2 is composed of a pair of left and right guide rails 4a and 4b, and the conveying traveling body 2 includes a pair of front and rear flangeless wheels 5a and 6a rolling on one of the guide rails 4a and a pair of front and rear flanged wheels 5b and 6b rolling on the other guide rail 4b and provided with flanges sandwiching the guide rail 4b, as shown in FIGS. 3 to 5. The conveying traveling body 2 has an upper surface provided with a plurality of workpiece supports 7 to support a workpiece (vehicle body) W and a plurality of workpiece fixtures 8 to fix the workpiece W to the conveying traveling body 2. The conveying traveling body 2 has both lateral sides arranged with passive plates 9a and 9b protruding laterally from positions in the vicinity of the rear end of a front-back direction length thereof and locked members 10a and 10b positioned in substantially the center of the front-back direction length. Further, the conveying traveling body 2 has a bottom installed with a pair of left and right engaged pins 11a and 11b so as to adjoin inside the front pair of left and right wheels 5a and 5b and installed with a pair of left and right engaged pins 12a and 12b at positions inside the rear pair of left and right wheels 6a and 6b and further inside than the immediately after the front paired engaged pins 11a and 11b. Those engaged pins 11a to 12b are all installed in a horizontal left and right direction between a pair of left and right support plates 13a and 13b, respectively.

A pair of left and right fixed guide rails 14a and 14b connected to the guide rails 4a and 4b are laid above the treatment bath 1 as the end of the ground traveling path 3. A rotation base 15 is provided above the treatment bath 1 so as to adjoin free ends of the guide rails 14a and 14b. The rotation base 15 has a front-back direction length substantially equal to an entire length in the traveling direction of the conveying traveling body 2. The rotation base 15 is supported at a position nearer to the front end, opposite to the rear end, where the fixed guide rails 14a and 14b are located than the front-back direction center so as to be rotatable in forward and reverse directions within a certain angle range by a horizontal rotation spindle 16 crossing in a left and right direction above the treatment bath 1. When the rotation base 15 is in a horizontal waiting posture, the front end thereof is positioned in substantially the center in the longitudinal direction of the treatment bath 1, as shown by the solid line in FIG. 1 and FIG. 2. A pair of left and right guide rails 17a and 17b connected to the free ends of the fixed guide rails 14a and 14b at that moment are laid on the rotation base 15.

Figure 6:
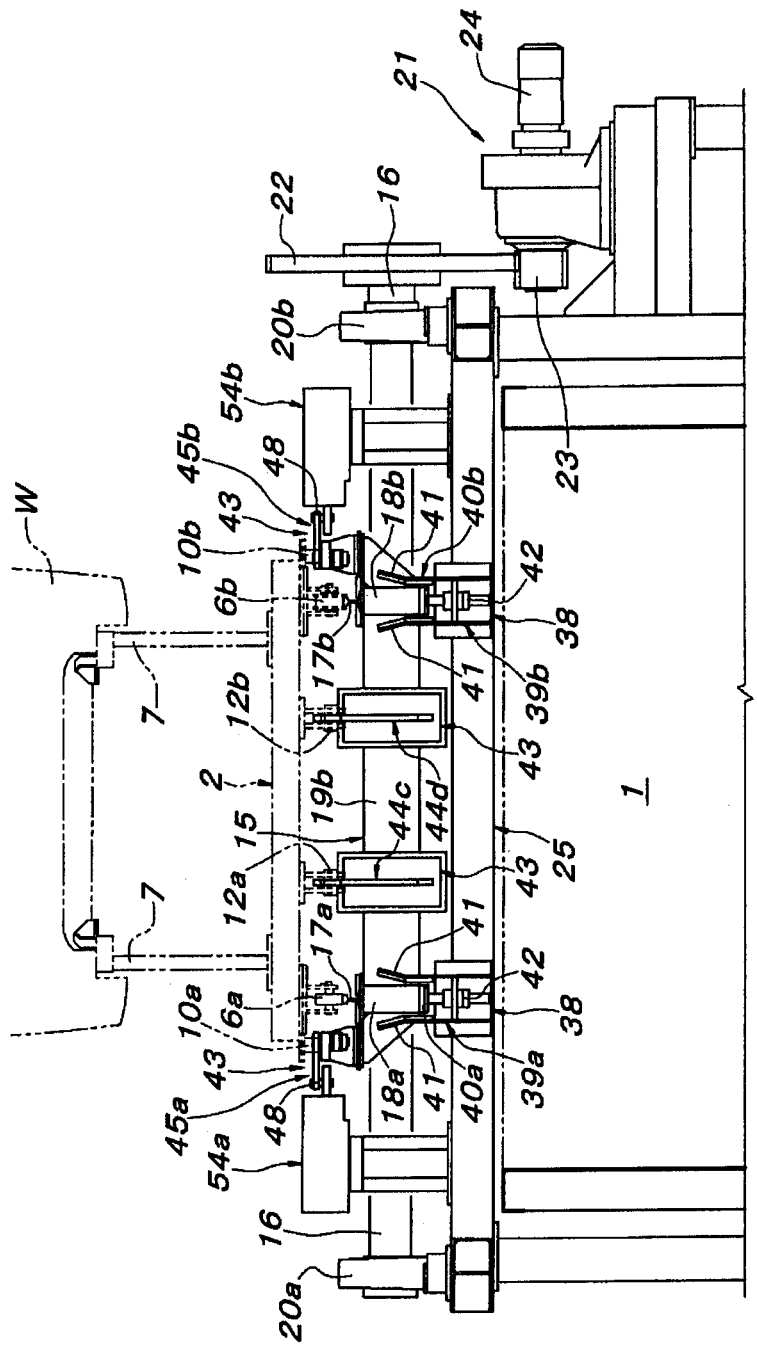
FIG. 6 is a rear view showing a rotation base at its home position and respective peripheral mechanism.
Figure 7:
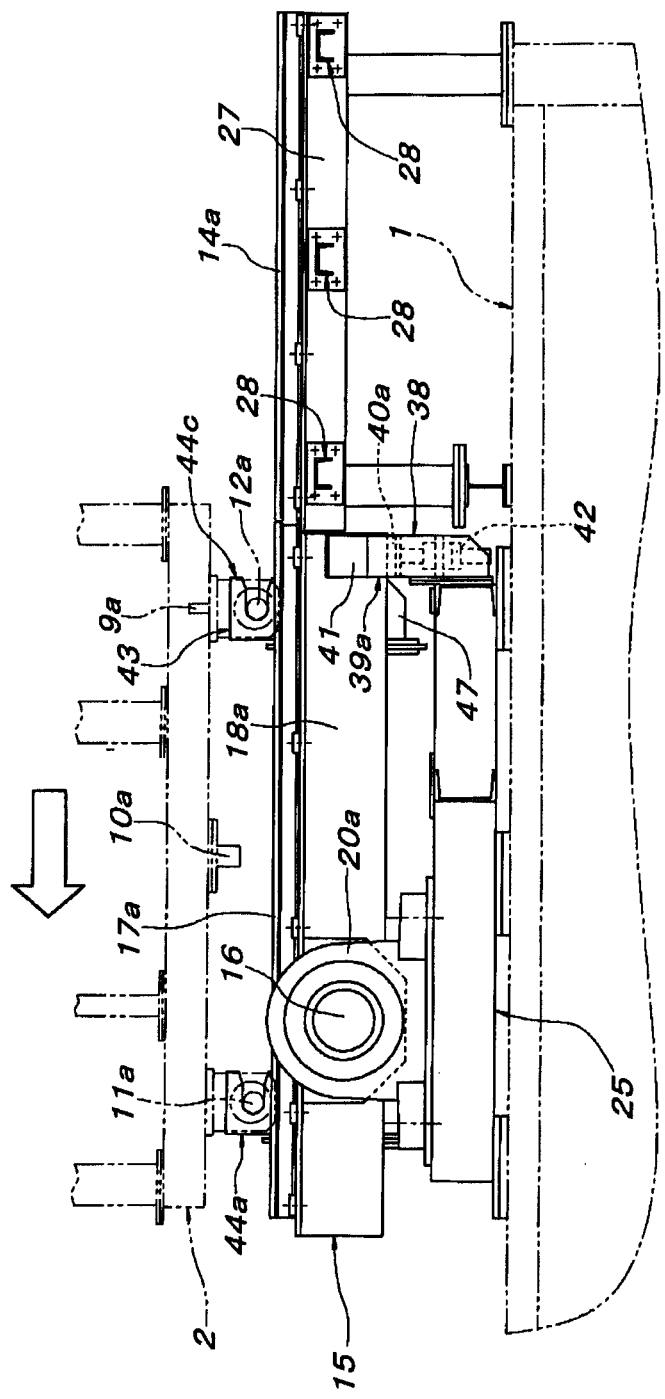
FIG. 7 is a side view showing a main part of the rotation base at its home position.

The rotation base 15 is in the shape of a rectangular frame composed of a pair of left and right front-back direction frame materials 18a and 18b and a pair of front and rear left-right direction frame materials 19a and 19b connecting respective both ends of the front-back direction frame materials 18a and 18b. The guide rails 17a and 17b are laid on the pair of left and right front-back direction frame materials 18a and 18b. The horizontal rotation spindle 16 penetrates the pair of left and right front-back direction frame materials 18a and 18b of the rotation base 15, which is fixed and integrated with the horizontal rotation spindle 16 at the front-back direction frame materials 18a and 18b. The horizontal rotation spindle 16 has both ends self-rotatably supported by bearings 20a and 20b arranged outside lateral both sides of the treatment bath 1, and driving mechanism 21 is interlocked and coupled with one of the ends. The driving mechanism 21 is composed of a large diameter spur gear 22 attached to the one end of the horizontal rotation spindle 16, a small diameter spur gear 23 meshed with the large diameter spur gear 22, and a speed reducer equipped motor 24 having an output shaft to which the small diameter spur gear 23 is attached. A fixed stand 25 in a portal shape is provided on the ground in such a manner as to stride over the treatment bath 1, as shown in FIG. 6 and FIG. 7. The bearings 20a and 20b and the motor 24 are supported by the fixed stand 25, and the fixed guide rails 14a and 14b are directly supported on the treatment bath 1.

Figure 9:
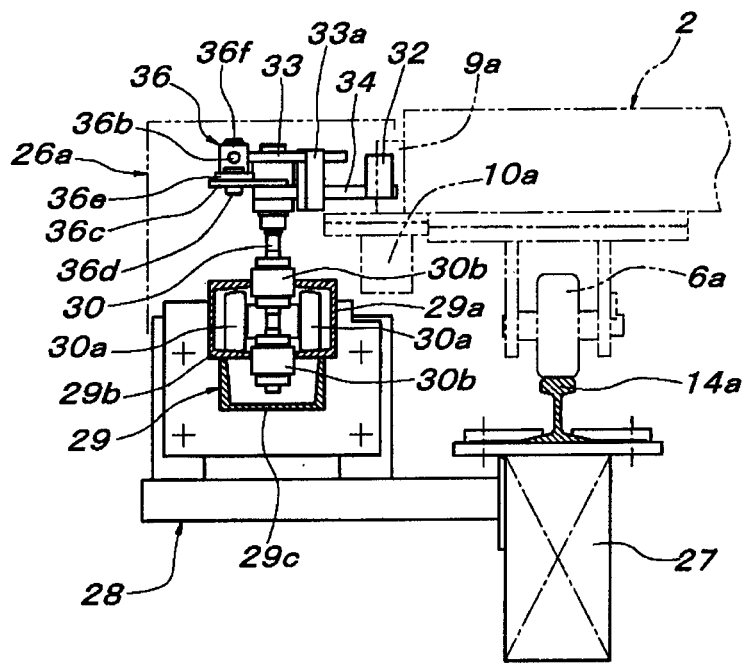
FIG. 9 is a longitudinal sectional rear view showing feeding mechanism on one side.

As shown in FIG. 2, a pair of left and right feeding mechanisms 26a and 26b are arranged so as to be positioned outside the pair of left and right fixed guide rails 14a and 14b. The feeding mechanisms 26a and 26b have a bilaterally symmetric structure, which will be described based on FIGS. 9 to 11 showing one of the feeding mechanisms 26a. Each of the feeding mechanisms 26a and 26b is supported via a supporting structure 28 on the front-back direction frame material 27 supporting the fixed guide rail 14a or 14b. The feeding mechanisms 26a or 26b is composed of a front-back direction guide rail unit 29 parallel to the fixed guide rail 14a or 14b, a movable body 30 supportedly guided to the guide rail unit 29 so as to be movable in the back and forth direction, a cylinder unit 31 reciprocally driving the movable body 30, a passive plate receiver 32 provided on the movable body 30, and a movable pusher 33.

The guide rail unit 29 is constituted by a pair of left and right mutually facing U-shaped rails 29a and 29b and a channel bar 29c integrating the U-shaped rails 29a and 29b below the U-shaped rails 29a and 29b. The movable body 30 is supportedly guided to the guide rail unit 29 so as to be movable in the back and forth direction by front and rear pairs of left and right supporting rollers 30a fitted inside the mutually facing U-shaped rails 29a and 29b and being self-rotatable about a horizontal axis and front and rear pairs of upper and lower anti-sway rollers 30b fitted between the mutually facing U-shaped rails 29a and 29b and being self-rotatable about a vertical axis. The passive plate receiver 32 is fixed on a rear side of a distal end of an L-shaped base plate 34 which is fixed at the upper end of the movable base 30, extends horizontally forward, and has a distal end bent inward at a right angle. The movable pusher 33 is pivotally supported above a proximal portion of the L-shaped base plate 34 so as to be rotatable about a vertical spindle 35.

Figure 10A:
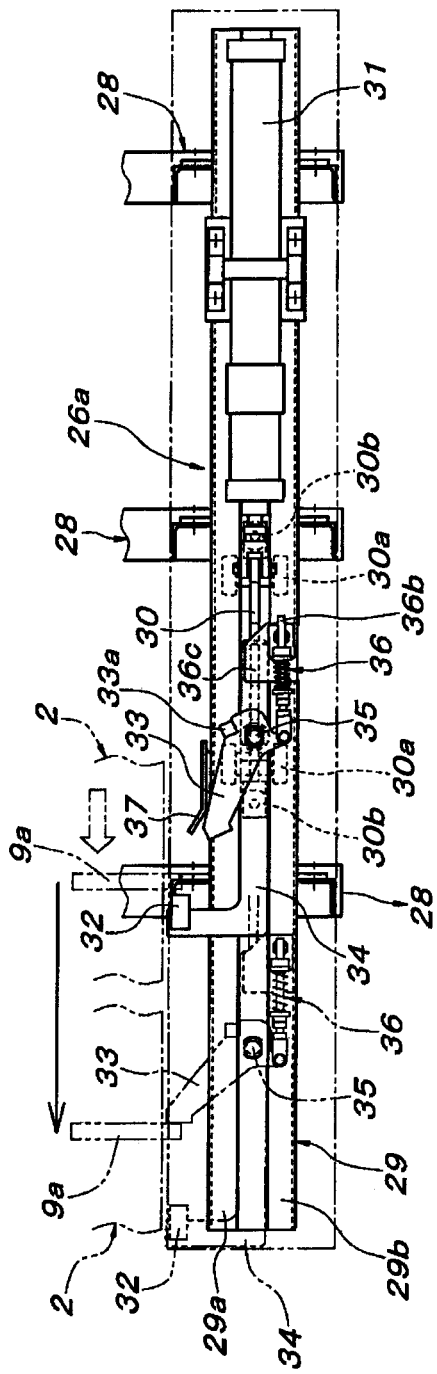
FIG. 10A is a plan view showing the feeding mechanism on one side and FIG. 10B is a side view thereof.
Figure 10B:
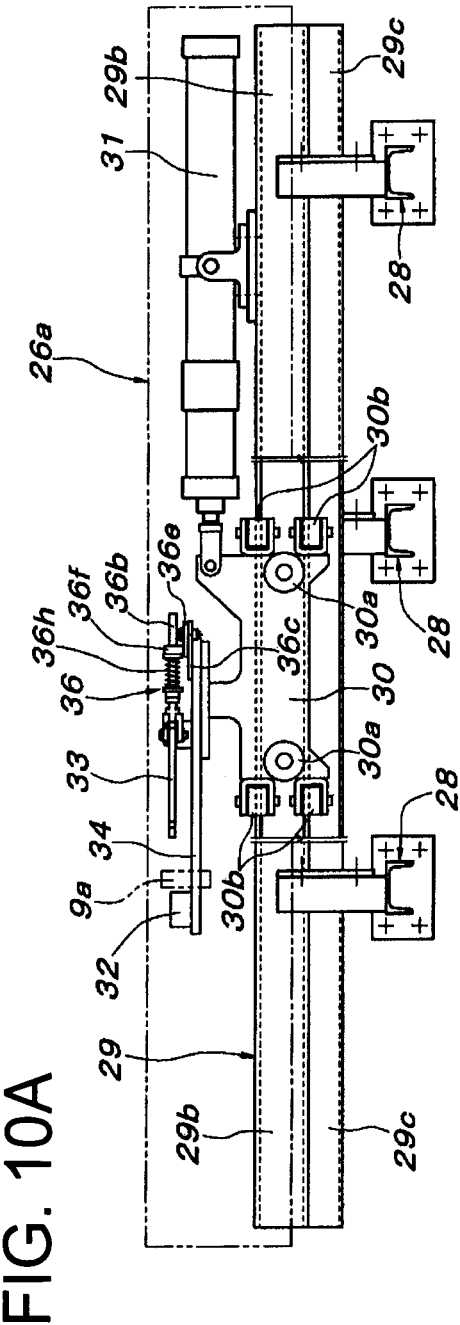
Figure 11:
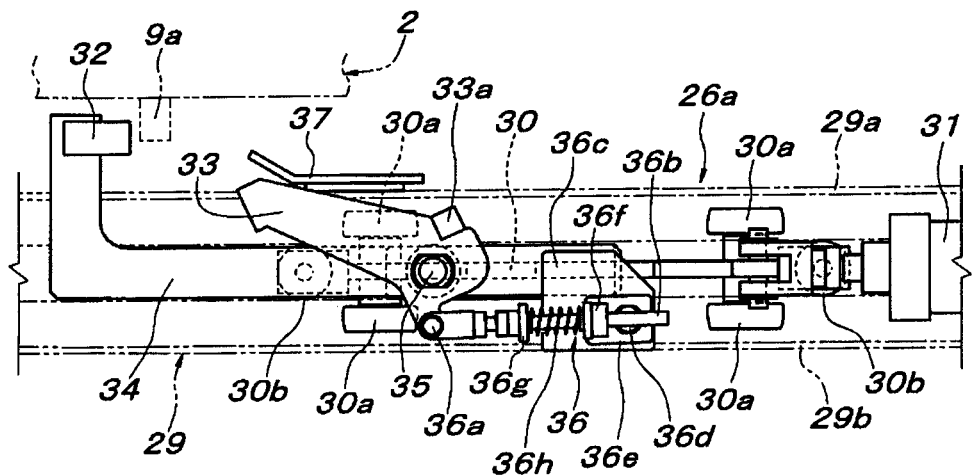
FIG. 11 is an enlarged plan view showing a main part of FIG. 10A.

The movable pusher 33 can rotate about the vertical spindle 35 between a feeding posture where a distal end thereof projects within a moving path of the passive plate 9a or 9b of the conveying traveling body 2 as shown by the imaginary line in FIG. 10 and a retreat posture to retreat outside from the moving path of the passive plate 9a or 9b as shown by the solid line in FIG. 10 and FIG. 11. The movable pusher 33 is biased to the feeding posture by biasing mechanism 36. A columnar member 33a attached to the movable pusher 33 abuts against a lateral face of the L-shaped base plate 34, whereby the movable pusher 33 is held in the feeding posture. The biasing mechanism 36 is composed of a rod 36b pivotally supported and coupled to the movable pusher 33 by a vertical pin 36a, a swinging plate 36e pivotally supported on a bearing plate 36c attached on the L-shaped base plate 34 so as to be rotatable about a vertical spindle 36d, a rod supporting member 36f fixed on the swinging plate 36e and penetrated by the rod 36b, and a compression coil spring 36h freely fitted to the rod 36b between the rod supporting member 36f and a spring seat 36g attached to the rod 36b. When the movable body 30 is made to retract to the vicinity of a retract limit position by the cylinder unit 31, as shown in FIG. 10A and FIG. 11, a cam plate 37 switches the movable pusher 33 having been held in the feeding posture by a biasing force of the biasing mechanism 36 to the retreat posture, against the biasing force along with the movement to the retract limit position. This cam plate 37 is attached outside one of the mutually facing U-shaped rails 29a of the guide rail unit 29. When the movable body 30 is at its home position of the retract limit position, the movable pusher 33 is held in the retreat posture by the cam plate 37.

A support mechanism 38 to support the rotation base 15 in the horizontal waiting posture is arranged on the fixed stand 25. The rotation base 15 is rotatably supported by the horizontal rotation spindle 16 at the position near the front end opposite to the rear end where the fixed guide rails 14a and 14b are located, as described above. Therefore, the support 38 supports the rear end of the rotation base 15 in the horizontal waiting posture, more specifically, rear ends of the pair of left and right front-back direction frame materials 27 which support the guide rails 17a and 17b, as shown in FIG. 6 and FIG. 7. The support 38 is attached to a left-right direction frame material 25a of the fixed stand 25. More specifically, the support 38 is composed of a pair of left and right positioning guides 39a and 39b to which the rear ends of the pair of left and right front-back direction frame materials 27 are fitted and receivers 40a and 40b supporting the rear ends of the front-back direction frame materials 27 within the positioning guides 39a and 39b respectively. The positioning guide 39a or 39b is composed of a pair of left and right guide plates 41 whose upper ends are inclined in a flared manner. The receiver 40a or 40b is configured such that the height thereof can be adjusted by a screw mechanism 42.

Figure 8:
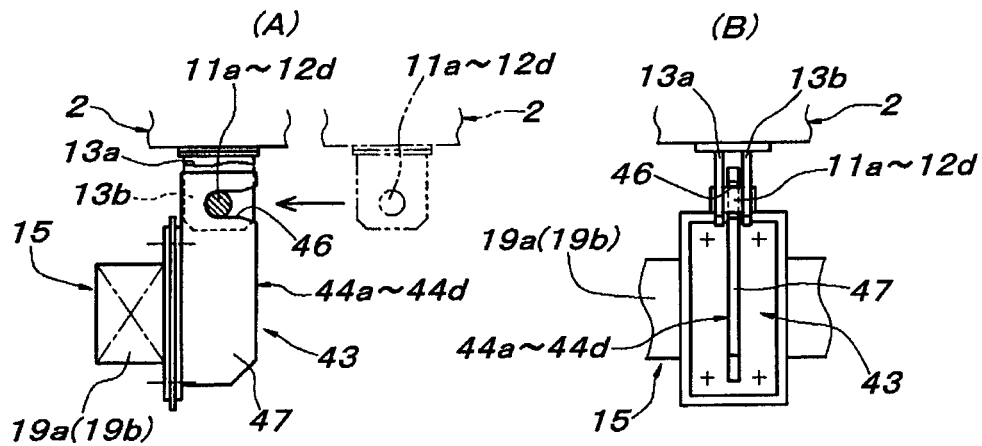
FIG. 8A is a partially cut away side view showing one of conveying traveling body positioning device on the rotation base in an operating state.
FIG. 8B is a rear view thereof of FIG. 8A.

A positioning and fixing device 43 to position and fix at a fixed position the conveying traveling body 2 having been transferred from the fixed guide rails 14a and 14b onto the guide rails 17a and 17b of the rotation base 15 and been moved forward is provided on the rotation base 15. The positioning and fixing device 43 is composed of four positioning members 44a to 44d as shown in FIG. 2 and a pair of left and right lock mechanisms 45a and 45b as shown in FIG. 2. The positioning members 44a to 44d are composed of vertical plates 47 formed with depressed portions 46 by notching the rear faces respectively, and the four engaged pins 11a to 12b at the bottom of the conveying traveling body 2 are horizontally fitted to the depressed portions 46 along with the forward movement of the conveying traveling body 2, as shown in FIGS. 6 to 8. The positioning members 44a to 44d are attached to the rear sides of the pair of front and rear left-right direction frame materials 19a and 19b constituting the rotation base 15.

Figure 12:
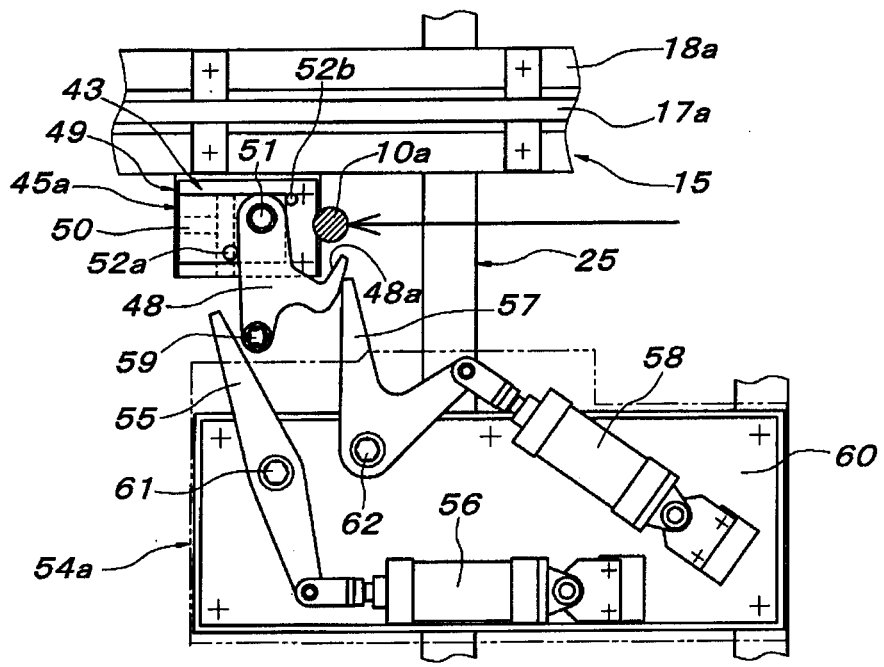
FIG. 12 is a plan view showing conveying traveling body locking mechanism and operation mechanism for the locking mechanism on one side on the rotation base.
Figure 13:
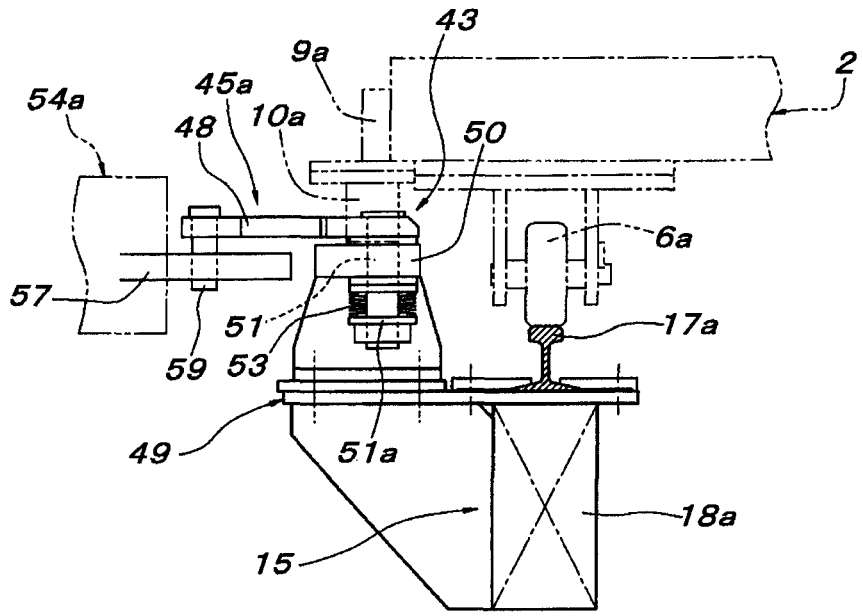
FIG. 13 is a partially omitted rear view of the above.
Figure 14:
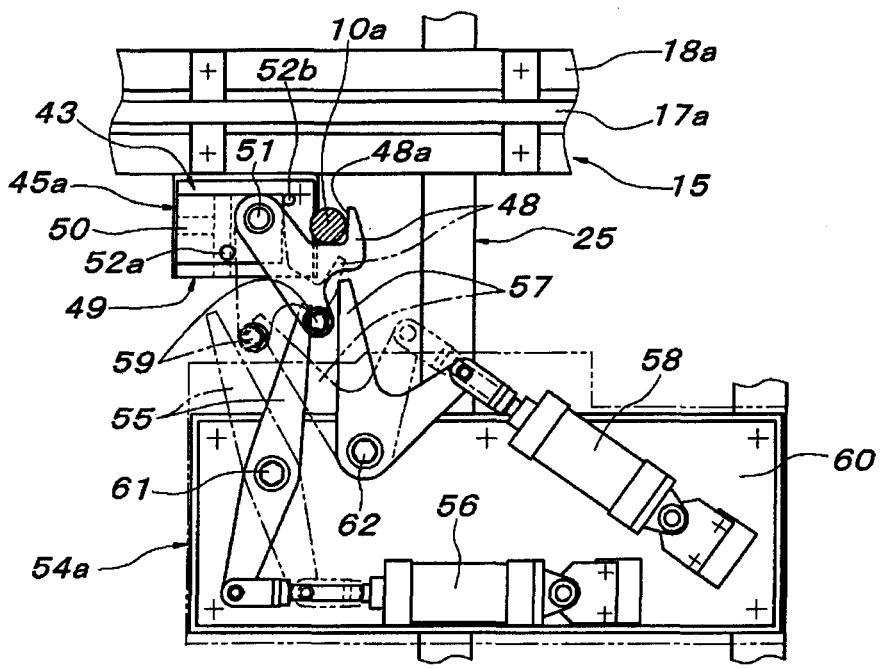
FIG. 14 is a plan view showing an operating state of the above.

The lock mechanisms 45a and 45b prevent the conveying traveling body 2 from retracting from the fixed position via locked members 10a and 10b composed of a pair of left and right vertical pins attached to lateral both sides of the conveying traveling body 2. As shown in FIGS. 12 to 14, the lock mechanisms 45a and 45b include respective locking movable pieces 48. The locking movable piece 48 is pivotally supported rotatably about a vertical spindle 51 on a horizontal bearing plate 50 attached outside each of the pair of left and right front-back direction frame materials 18a and 18b constituting the rotation base 15 via the supporting structure 49. The locking movable piece 48 can rotationally switch between a fixation released state as shown in FIG. 12 and a fixation active state as shown in FIG. 14 between stopper pins 52a and 52b fixed on the bearing plate 50. A large friction resistance is given to rotation about the vertical spindle 51 by a plurality of disc springs 53 freely fitted to the vertical spindle 51 between the bearing plate 50 and a spring seat 51a at the lower end of the vertical spindle 51 in order to bias the vertical spindle 51 downward. The locking movable piece 48 is held in the fixation released state and the fixation active state by the friction resistance. When being in the fixation active state as shown in FIG. 14, the locking movable piece 48 is in a hook shape such that the vertical spindle 51 is positioned forward in the advancing direction of the conveying traveling body 2 relative to the locked member 10a or 10b of the conveying traveling body 2 which is positioned inside the locking movable piece 48 and such that an inner face 48a adjoining the rear side of the locked member 10a or 10b is perpendicular to the traveling direction of the conveying traveling body 2. Thus, the locking movable piece 48 does not rotate toward the fixation released state as shown in FIG. 12 by an acting force which acts upon the locking movable piece 48 from the locked member 10a or 10b when the locking movable piece 48 is in the fixation active state as shown in FIG. 14 and the conveying traveling body 2 attempts to retract.

Operation mechanisms 54a and 54b for the locking movable pieces 48 of the lock mechanisms 45a and 45b provided on lateral both sides of the rotation base 15 are provided on the fixed stand 25 which supports the rotation base 15 in the horizontal waiting posture, as shown in FIG. 2. The operation mechanisms 54a or 54b are composed of a first operating piece 55 forcibly swinging the locking movable piece 48 from the fixation released state to the fixation active state, a cylinder unit 56 serving as a driving actuator for the first operating piece 55, a second operating piece 57 forcibly swinging the locking movable piece 48 from the fixation active state to the fixation released state, and a cylinder unit 58 serving as a driving actuator for the second operating piece 57. An operated pin 59 protruding vertically downward so as to constantly be positioned outside the bearing plate 50 and the supporting structure 49 thereof is provided to the locking movable piece 48. The first operating piece 55 pushingly moves the operated pin 59 rearward by a forward to rearward swing of the operated pin 59 and is pivotally supported on a pedestal 60 supported on the fixed stand 25, by a vertical spindle 61. The second operating piece 57 pushingly moves the operated pin 59 forward by a rearward to forward swing of the operated pin 59 and is pivotally supported on the pedestal 60 by a vertical spindle 62. The cylinder units 56 and 58 driving the respective operating pieces 55 and 57 are placed between the respective operating pieces 55 and 57 and the pedestal 60.

Hereinafter, use and operation of the present invention will be described. The conveying traveling body 2 on which a workpiece W is loaded and fixed at a fixed position by using the workpiece supports 7 and the workpiece fixtures 8 is driven by a known propulsion device (not shown) such as a chain-driven pusher or a friction drive wheel which press-contacts with a friction drive strip plate protrudingly provided along the traveling direction to the bottom of the conveying traveling body 2. The conveying traveling body 2 travels on the guide rails 4a and 4b of the ground traveling path 3 toward the treatment bath 1, is transferred from the guide rails 4a and 4b on the ground traveling path 3 onto the fixed guide rails 14a and 14b juxtaposed to the treatment bath 1, and is sent to a position passed on to the pair of left and right feeding mechanisms 26a and 26b arranged outside both sides of the fixed guide rails 14a and 14b.

The feeding mechanisms 26a and 26b are in such a state that the movable bodies 30 are at the home positions of the retract limit positions as shown in FIG. 10A and FIG. 11, the movable pushers 33 are switched to the retreat posture by the cam plates 37, and only the passive plate receivers 32 located before the movable pushers 33 project within the moving paths of the passive plates 9a and 9b of the conveying traveling body 2. The conveying traveling body 2 having been sent onto the fixed guide rails 14a and 14b as described above stops when the passive plates 9a and 9b thereof pass the movable pushers 33 in the retreat posture and reach positions immediately before the passive plate receivers 32. The rotation base 15 at this moment is in the horizontal waiting posture as shown by the solid line in FIG. 1 and the rear end thereof is supported by the support 38, as shown in FIG. 6 and FIG. 7.

Once the conveying traveling body 2 is sent to the predetermined position as described above, the pair of left and right feeding mechanism 26a and 26b are activated. That is, the movable bodies 30 are moved forward from the home positions by the cylinder units 31. At the beginning of this forward movement, the movable pushers 33 depart forward from the cam plates 37 and are rotated about the vertical spindles 35 by the compression coil springs 36h of the biasing mechanism 36, and the columnar members 33a are switched to the feeding posture of abutting against the lateral face of the L-shaped base plate 34. As a result, the passive plates 9a and 9b of the conveying traveling body 2 having been stopped at the predetermined position are sandwiched between the movable pushers 33 in the feeding posture and the passive plate receivers 32 located therebefore. The movable pushers 33 in the feeding posture push the passive plates 9a and 9b, whereby the conveying traveling body 2 starts to move forward. In this case, forward traveling of the conveying traveling body 2 faster than the speed of the movable pushers 33 due to inertia is prevented by the passive plate receivers 32 which move forward together with the movable pushers 33.

The conveying traveling body 2 having been propelled by the pair of left and right feeding mechanism 26a and 26b via the passive plates 9a and 9b as described above is transferred from the fixed guide rails 14a and 14b onto the guide rails 17a and 17b of the rotation base 15 in the horizontal waiting posture. When the whole of the conveying traveling body 2 is transferred to the fixed position on the rotation base 15, the movable bodies 30 of the feeding mechanism 26a and 26b stop at their advance limit positions. When the conveying traveling body 2 is fed into the fixed position on the rotation base 15, the four engaged pins 11a to 12b at the bottom of the conveying traveling body 2 are horizontally fitted inside the depressed portions 46 of the vertical plates 47 at the four positioning members 44a to 44d of the positioning and fixing device 43 of the rotation base 15, as shown in FIG. 7 and FIG. 8. Furthermore, the locked members 10a and 10b at lateral both sides of the conveying traveling body 2 reach inside the locking movable pieces 48 in the fixation released state at the pair of left and right lock mechanisms 45a and 45b of the positioning and fixing device 43, as shown in FIG. 12. In this state, the first operating pieces 55 of the operation mechanism 54a and 54b positioned outside the respective lock mechanisms 45a and 45b are driven by the cylinder units 56, the operated pins 59 of the locking movable pieces 48 are pushingly moved rearward by the first operating pieces 55, and then the locking movable pieces 48 are rotated about the vertical spindles 51 from the fixation released state to the fixation active state as shown in FIG. 14. The rotation of the locking movable piece 48 at this moment is carried out against the large friction resistance given by the disc springs 53.

Since the locking movable pieces 48 of the pair of left and right lock mechanisms 45a and 45b are switched to the fixation active state, rearward movement of the locked members 10a and 10b of the conveying traveling body 2 is prevented by the locking movable pieces 48, as shown in FIG. 14. Further, forward movement of the conveying traveling body 2 is prevented by the four positioning members 44a to 44d of the rotation base 15 to which the four engaged pins 11a to 12b of the conveying traveling body 2 are fitted. As a result, the conveying traveling body 2 having been fed onto the rotation base 15 by the pair of left and right feeding mechanism 26a and 26b is positioned in such a manner as not to move in the back and forth direction from the fixed position on the rotation base 15. Further, upward lifting of the conveying traveling body 2 with respect to the guide rails 17a and 17b on the rotation base 15 is prevented by the four positioning members 44a to 44d (the depressed portions 46 of the vertical plates 47) of the rotation base 15 to which the four engaged pins 11a to 12b of the conveying traveling body 2 are fitted. Therefore, the conveying traveling body 2 is brought into a fixed state at the fixed position on the rotation base 15.

Once the conveying traveling body 2 is positioned and fixed at the fixed position on the rotation base 15 in the horizontal waiting posture by the positioning members 44a to 44d and lock mechanisms 45a and 45b of the positioning and fixing device 43 in the above-described manner, the rotation base 15 is rotated a predetermined angle forwardly downward about the horizontal rotation spindle 16 by the driving mechanism 21. More specifically, the speed reducer equipped motor 24 of the driving mechanism 21 is operated to rotationally drive the horizontal rotation spindle 16 in the forward direction via the small diameter spur gear 23 and the large diameter spur gear 22, and the rotation base 15 fixed to the horizontal rotation spindle 16 at a position in the vicinity of the front end thereof is rotated forwardly downward. As a result, the conveying traveling body 2 rotates about the horizontal rotation spindle 16 in such a manner as to turn upside down together with the rotation base 15, as shown by the imaginary line in FIG. 1, and the workpiece W having been fixed on the conveying traveling body 2 is dipped in a treatment liquid within the treatment bath 1. A first rotation stop angle (185 degrees in the embodiment as shown) of the horizontal rotation spindle 16 with respect to the treatment liquid at the time of dipping the workpiece W, speed shifting during rotation, and repeated switching of rotation directions while the workpiece W is dipped are automatically executed by a processing program having been preset according to processing details.

When the rotation base 15 is rotated forwardly downward from the horizontal waiting posture in order to dip the workpiece W, the passive plates 9a and 9b of the conveying traveling body 2 leave upward from between the passive plate receivers 32 and movable pushers 33 at the advance limit positions of the pair of left and right feeding mechanism 26a and 26b having fed the conveying traveling body 2 to the fixed position on the rotation base 15. Further, the lock mechanisms 45a and 45b of the positioning and fixing device 43 preventing the locked members 10a and 10b of the conveying traveling body 2 from retracting rotate together with the rotation base 15 in such a manner as to depart upward relative to the operation mechanism 54a and 54b. As long as the first operating pieces 55 of the operation mechanism 54a and 54b are returned to the retract limit positions as shown by the imaginary line in FIG. 14 by the cylinder units 56 at this moment, the operated pins 59 of the locking movable pieces 48 easily leave upward from between the first operating pieces 55 and second operating pieces 57 of the operation mechanism 54a and 54b. The locking movable pieces 48 of the lock mechanisms 45a and 45b at the rotation base 15 having been rotated from the horizontal waiting posture are held, by the friction resistances given by the disc springs 53, in the fixation active state for preventing the locked members 10a and 10b from retracting.

Upon completion of the dipping of the workpiece W, the rotation base 15 is rotated to return to the horizontal waiting posture by the driving mechanism 21. When the rotation base 15 is returned to the horizontal waiting posture where the rear end thereof is supported by the support mechanism 38, the pair of left and right passive plates 9a and 9b of the conveying traveling body 2 having been positioned and fixed to the fixed position on the rotation base 15 by the positioning and fixing device 43 are downwardly fitted between the passive plate receivers 32 and movable pushers 33 at the advance limit positions of the feeding mechanism 26a and 26b, and at the same time, the operated pins 59 of the locking movable pieces 48 in the fixation active state of the pair of left and right lock mechanisms 45a and 45b at the rotation base 15 fixing the pair of left and right locked members 10a and 10b of the conveying traveling body 2 are also downwardly fitted between the first operating pieces 55 and second operating pieces 57 of the operation mechanism 54a and 54b, whereby the rotation base 15 returns to the state immediately after the conveying traveling body 2 is fed to the fixed position on the rotation base 15 by the pair of left and right feeding mechanism 26a and 26b.

After the rotation base 15 is returned to the horizontal waiting posture, as shown by the imaginary line in FIG. 14, the second operating pieces 57 of the operation mechanism 54a and 54b are driven forward by the cylinder units 58. By these second operating pieces 57, the operated pins 59 of the locking movable pieces 48 at the lock mechanisms 45a and 45b of the rotation base 15 are pushed forward, and the locking movable pieces 48 are returned to the fixation released state as shown in FIG. 12. Subsequently, the movable bodies 30 of the pair of left and right feeding mechanism 26a and 26b are made to retract from the advance limit positions, whereby the passive plate receivers 32 retracting with the movable bodies 30 can draw and move the conveying traveling body 2 from on the guide rails 17a and 17b of the rotation base 15 onto the fixed guide rails 14a and 14b via the passive plates 9a and 9b of the conveying traveling body 2. When the movable bodies 30 reach the home positions of the retract limit positions, the conveying traveling body 2 already reaches the predetermined position on the fixed guide rails 14a and 14b. Thus, the conveying traveling body 2 has only to be sent back to the ground traveling path 3 again by the propulsion device whose illustration is omitted.

Next, another embodiment of the locking movable piece of the positioning and fixing device 43 to position the conveying traveling body 2 having been transferred onto the rotation base 15 at a fixed position and fix the conveying traveling body 2 to the rotation base 15 and the operation mechanism for the locking movable piece will be described based on FIGS. 15 to 20. A locking movable piece 63 and operation mechanism 64 therefore according to this other embodiment are provided as a left and right pair, corresponding to the locked members 10a and 10b provided at lateral both sides of the conveying traveling body 2 respectively, in the same manner as the locking movable pieces 48 and the operation mechanism 54a and 54b therefore as shown in the above-described embodiment. However, the locking movable piece 63 and the operation mechanism 64 therefore on one side will be illustrated and described.

A support plate 65 is protrudingly provided on a lateral face of the rotation base 15. On this support plate 65, a pair of left and right bearing plates 66 are protrudingly provided. The front end of the locking movable piece 63 is pivotally supported vertically swingably between the bearing plates 66 by a horizontal left-right direction spindle 67. An engaging portion 63a is provided protruding upward from the rear end of the locking movable piece 63. The locking movable piece 63 is provided with an operated portion 63b which reciprocates in a back and forth linear direction in synchronization with the vertical swinging movement of the locking movable piece 63. The operated portion 63b is composed of a pair of left and right links 69a and 69b having upper ends coupled to lateral both sides of the locking movable piece 63 by a spindle 68 so as to be swingable in the back and forth direction, a cam follower roller 71 pivotally supported at a lower end between both links 69a and 69b by a horizontal left-right direction spindle 70, and a pair of left and right guide rollers 73a and 73b supported at both ends of the spindle 70 so as to fit into long guiding holes 72 provided to the pair of left and right bearing plates 66 and elongated in the back and forth direction. Further, a pair of left and right supporting rollers 74a and 74b rolling outside the pair of left and right links 69a and 69b and on the support plate 65 are supported by the spindle 70.

In addition, a compression coil spring 75 to bias the spindle 70 toward rear ends of the long guiding holes 72 is juxtaposed. The compression coil spring 75 is fitted outside a front-back direction rod 77 having a front end coupled to the spindle 70 and the other end penetrating a spring seat 76 protrudingly provided on the support plate 65 at a position away forward from the pair of left and right bearing plates 66, between the spring seat 76 and a spring seat 78 provided to the rod 77 and being adjustable in position. The front end of the rod 77 is fixed to a U-shaped member 79 coupled to the spindle 70 vertically swingably while sandwiching the cam follower roller 71. Reference symbol 80 denotes a stopper member attached to the rear end of the rod 77.

Figure 15:
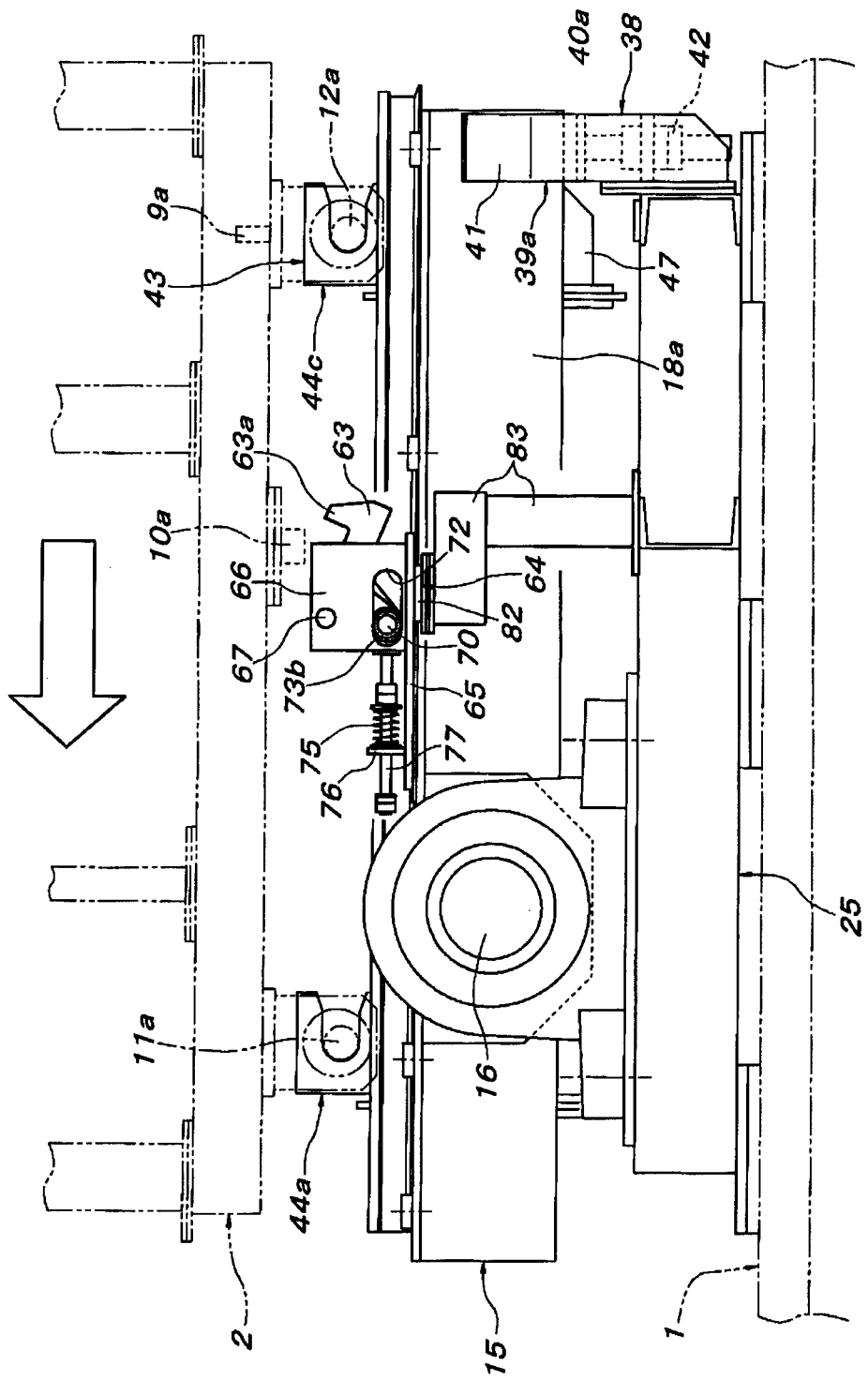
FIG. 15 is a side view showing another embodiment of a locking movable piece of positioning and fixing device which fixes the conveying traveling body on the rotation base and operation mechanism for the locking movable piece.
Figure 16:
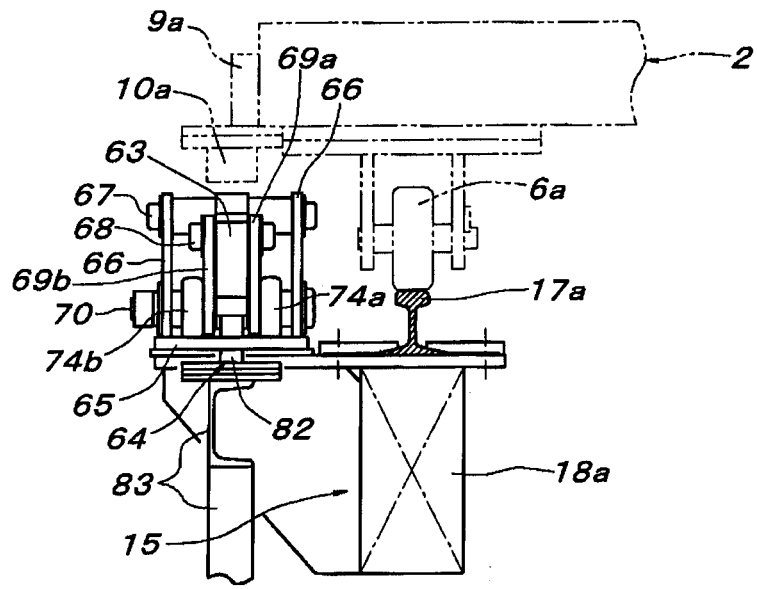
FIG. 16 is a rear view of a main part of FIG. 15.
Figure 17:
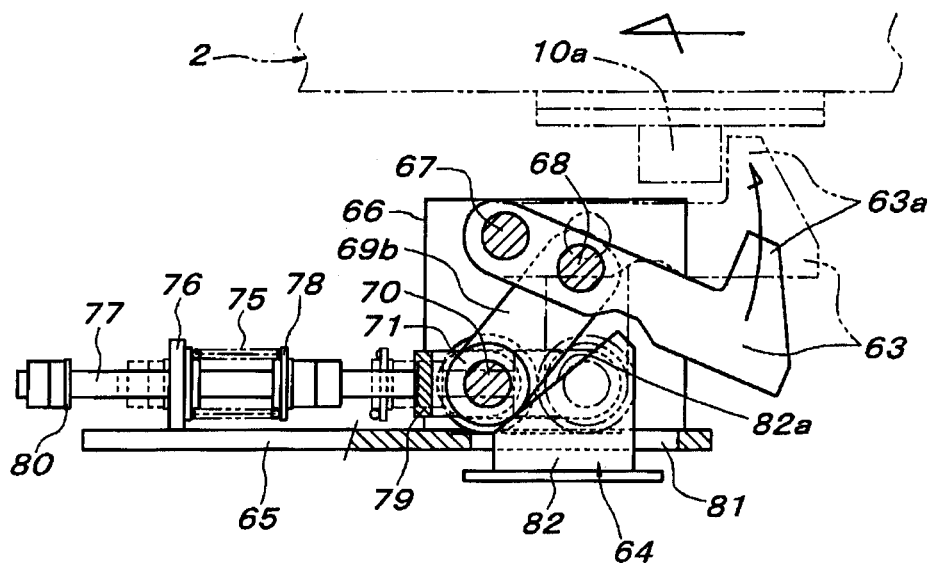
FIG. 17 is an enlarged longitudinal sectional side view of the main part of FIG. 15.
Figure 18:
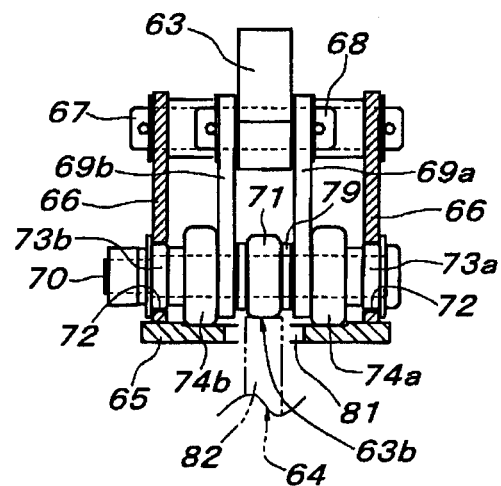
FIG. 18 is a longitudinal sectional rear view of the locking movable piece shown in FIG. 15 in a locking active state.
Figure 19:
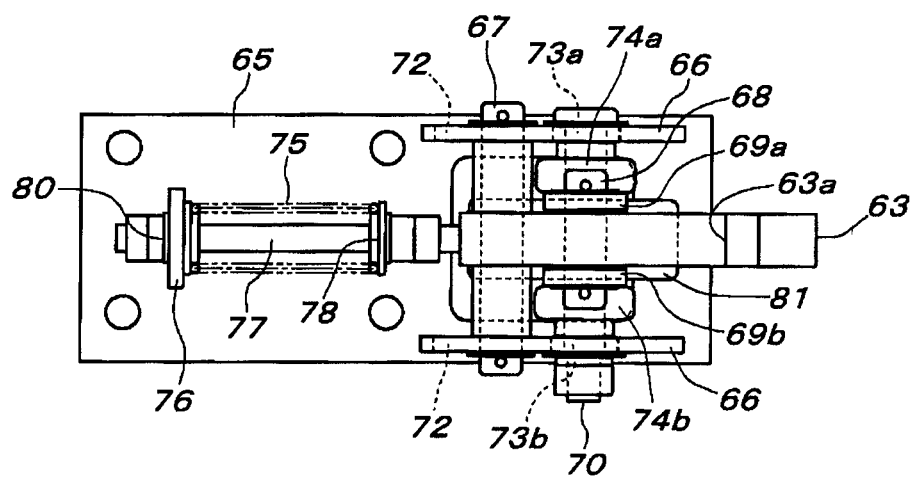
FIG. 19 is a plan view of the locking movable piece shown in FIG. 15 in the locking active state.

The support plate 65 is provided with a long hole 81 elongated in the back and forth direction below the back and forth moving path of the cam follower roller 71. As shown in FIGS. 15 to 17, an operation member 82 protruding higher than the support plate 65 through the long hole 81 of the support plate 65 when the rotation base 15 is at the horizontal waiting position is arranged on the fixed stand 25 via the support member 83. The operation member 82 is formed from a flat plate along the back and forth direction and has an upper hem provided with an inclined cam surface 82a forcibly moving the cam follower roller 71 forward against the biasing force of the compression coil spring 75 at the time of protruding upward from the long hole 81 of the support plate 65. That is, the operation mechanism 64 for the locking movable piece 63 in this embodiment is constituted by the operation member 82 positionally fixed to the fixed stand 25 only.

According to the above-described configuration, the positionally fixed operation member 82 on the fixed stand 25 protrudes higher than the support plate 65 of the rotation base 15 through the long hole 81 of the support plate 65 and the inclined cam surface 82a of the operation member 82 forcibly moves the cam follower roller 71 forward against the biasing force of the compression coil spring 75, when the rotation base 15 is at the horizontal waiting position, as shown in FIGS. 15 to 17. More specifically, the cam follower roller 71, the spindle 70, the supporting rollers 74a and 74b, and the guide rollers 73a and 73b are moved toward front ends of the long guiding holes 72 and lower ends of the pair of left and right links 69a and 69b are pulled forward to draw the locking movable piece 63 downward, when the rotation base 15 is at the horizontal waiting position. That is, the locking movable piece 63 is tilted downward about the spindle 67, and the engaging portion 63a at the rear end thereof is switched to a locking released state of being away below the moving path of the locked member 10a or 10b at the time when the conveying traveling body 2 moves onto and leaves the rotation base 15. Thus, the conveying traveling body 2 can be made to move onto the rotation base 15 at the horizontal waiting position in the same manner as the earlier described embodiment.

Figure 20:
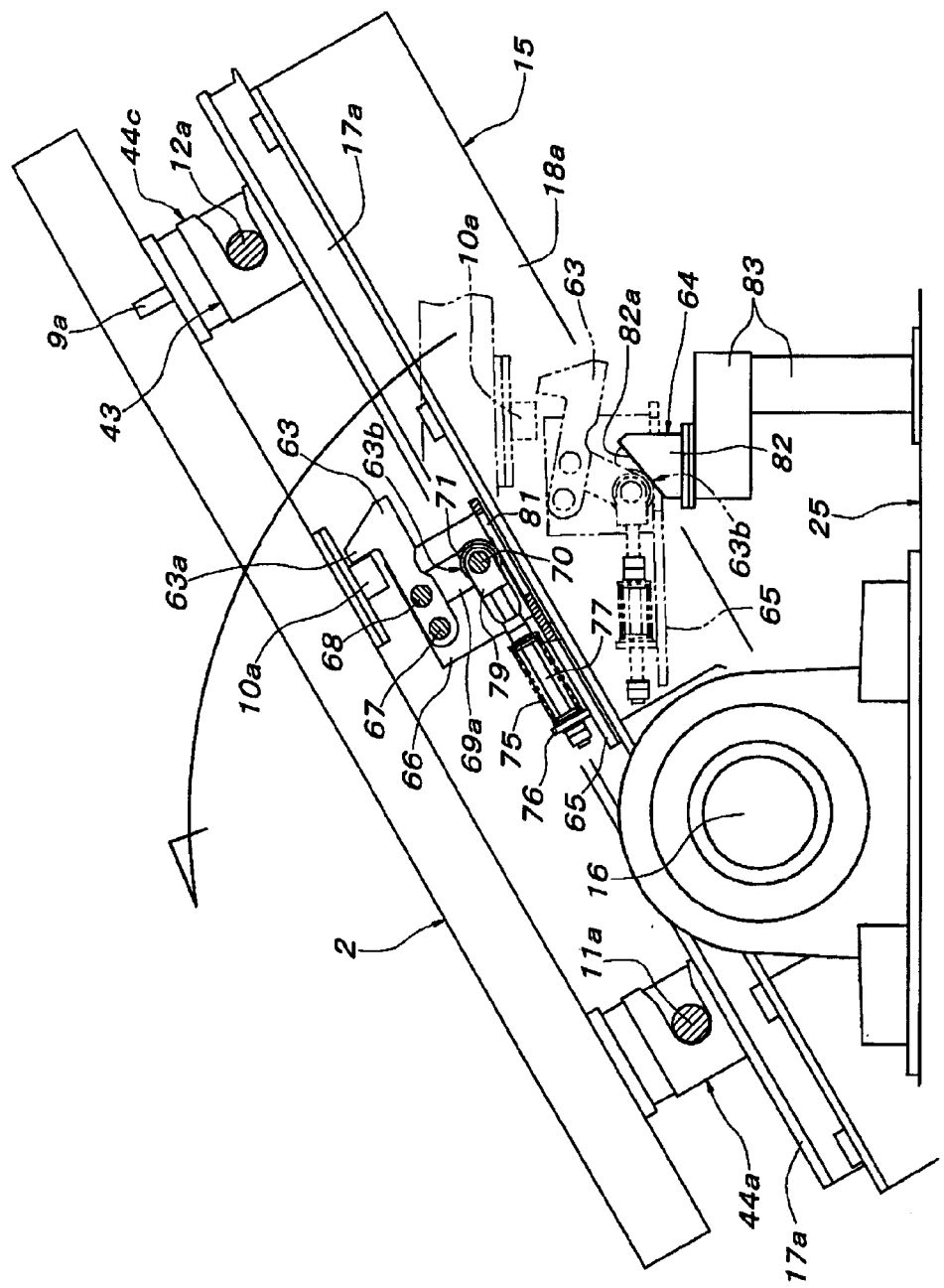
FIG. 20 is a partial longitudinal sectional side view explaining an operation where the locking movable piece shown in FIG. 15 is changed from a locking released state to the locking active state.

When the conveying traveling body 2 reaches the predetermined position on the rotation base 15 and the engaged pins 11a to 12b of the conveying traveling body 2 are fitted to the positioning members 44a to 44d of the rotation base 15 as in the same manner as the earlier described embodiment, the rotation base 15 is rotationally driven about the horizontal rotation spindle 16 in a front lowered direction as shown in FIG. 20. Along with the rotation of the rotation base 15, the cam follower roller 71 of the rotation base 15 departs upward from the positionally fixed operation member 82 on the fixed stand 25. As a result, the cam follower roller 71 is press-moved rearward by the biasing force of the compression coil spring 75 along with the rotation of the rotation base 15. This biasing force of the compression coil spring 75 moves the cam follower roller 71, the spindle 70, the supporting rollers 74a and 74b, and guide rollers 73a and 73b to front end positions of the long guiding holes 72 and pushes up the locking movable piece 63 via the pair of left and right links 69a and 69b. Thus, when the rotation base 15 slightly rotates and the operation member 82 downwardly gets out of the long hole 81 of the support plate 65 at the rotation base 15, the guide rollers 73a and 73b reach the front end positions of the long guiding holes 72 (the advance limit positions), the pair of left and right links 69a and 69b take a substantially perpendicular support posture with respect to the locking movable piece 63, and the locking movable piece 63 is switched to the locking active state where the engaging portion 63a at the rear end thereof is positioned immediately after the locked member 10a or 10b of the conveying traveling body 2 positioned at the fixed position on the rotation base 15.

Since the locking movable piece 63 is automatically switched from the locking released state to the locking active state at the initial stage of rotation of the rotation base 15 as described above, the conveying traveling body 2 having been transferred to the fixed position on the rotation base 15 can be fixed at the fixed position on the rotation base 15 as in the same manner as the earlier described embodiment due to that the engaged pins 11a to 12b of the conveying traveling body 2 are fitted to the positioning members 44a to 44d of the rotation base 15 and that the locking movable piece 63 in the locking active state of the rotation base 15 is positioned immediately after the locked member 10a or 10b of the conveying traveling body 2.

When the rotation base 15 rotates reversely and returns to its original horizontal waiting position, the operation member 82 of the fixed stand 25 enters upwardly into the long hole 81 of the support plate 65 at the rotation base 15 as above and the inclined cam surface 82a thereof forcibly moves the lower ends of the pair of left and right links 69a and 69b forward against the biasing force of the compression coil spring 75 via the cam follower roller 71 and draws the locking movable piece 63 downward to switch the locking movable piece 63 to the locking released state. Therefore, the engaging portion 63*a* at the rear end of the locking movable piece 63 gets away lower than the moving path of the locked member 10*a* or 10*b* at the time when the conveying traveling body 2 moves onto and leaves the rotation base 15, and thus, the conveying traveling body 2 can be made to retreat from on the rotation base 15 at the horizontal waiting position in the same manner as the earlier described embodiment.

The guide rails 17*a* and 17*b* are shown as the traveling body guiding mechanism to travelably support and guide the conveying traveling body 2 on the rotation base 15. However, if sled-like rails are provided to the conveying traveling body 2, traveling body guiding mechanism composed of a series of rollers travelably supporting and guiding the conveying traveling body 2 via the sled-like rails can be provided on the rotation base 15 as well.

The dipping apparatus of the present invention can be utilized as a dipping apparatus of flipping a vehicle body of an automobile having been transferred while fixed on a conveying traveling body, upside down together with the conveying traveling body, dipping the vehicle body in a treatment bath where painting or surface treatment before and after the painting on the vehicle body is performed, and carrying out the surface treatment of the vehicle body.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A dipping apparatus for dipping a workpiece into a treatment bath to treat a surface thereof comprising:
   a horizontal spindle crossing above the treatment bath;
   a rotation base rotatably supported about said horizontal spindle;
   a driving mechanism configured to rotate said rotation base in forward and reverse directions between a horizontal waiting posture above the treatment bath and rotated forwardly and downwardly to an upside down flipped posture from said horizontal waiting posture;
   a traveling body guiding mechanism provided on said rotation base so as to travelably support and guide a conveying traveling body along a back and forth direction, orthogonal to said horizontal spindle;
   a ground traveling path from which said conveying traveling body is configured to be transferred onto said traveling body guiding mechanism of said rotation base in said horizontal waiting posture, said ground traveling path serving as both an approach path and a retreat path of said conveying traveling body with respect to said rotation base and connected with said traveling body guiding mechanism only at a rear end of said rotation base in said horizontal waiting posture;
   a positioning and fixing device to position said conveying traveling body after being transferred from said rear end of said rotation base onto said rotation base via said traveling body guiding mechanism at a fixed position and coupling said conveying traveling body to said rotation base;
   a feeding mechanism to feed said conveying traveling body to said fixed position on said rotation base positioned by said positioning and fixing device;
   an operation mechanism to switch said positioning and fixing device between a fixation released state and a fixation active state;
   wherein said rotation base is supported at a position nearer to a front end thereof than a central position in the back and forth direction thereof by said horizontal spindle, and wherein a support mechanism receives said rear end of said rotation base in said horizontal waiting posture; and
   wherein said rotation base is composed of a pair of left and right front-back direction frame materials, said traveling body guiding mechanism on said rotation base is composed of a pair of left and right guide rails which are laid on said front-back direction frame materials constituting said rotation base and support wheels of said conveying traveling body, and said support mechanism is composed of a pair of left and right positioning guides to which rear ends of said pair of left and right front-back direction frame materials are fitted and wherein receivers receive said rear ends of said front-back direction frame materials.

2. The dipping apparatus according to claim 1, wherein said conveying traveling body has a bottom installed with at least front and rear pairs of horizontal left-right direction engaged pins, and said positioning and fixing device is composed of at least front and rear pairs of positioning members having lateral depressed portions to which said front and rear pairs of horizontal left-right direction engaged pins of said conveying traveling body having moved onto the rotation base are fitted horizontally and a locking movable piece being switchable between a fixation active state for preventing retracting movement of said conveying traveling body such that said engaged pins on said conveying traveling body are fitted inside said respective lateral depressed portions of said positioning members and a fixation released state of allowing the retracting movement of said conveying traveling body.

3. The dipping apparatus according to claim 2, wherein said locking movable piece of said positioning and fixing device is pivotally supported at said rotation base so as to be swingingly engaged with and detached from a locked member provided to the conveying traveling body and is juxtaposed with a spring for holding said locking movable piece in a fixation active state of being engaged with said locked member and in a fixation released state of being detached from said locked member.

4. The dipping apparatus according to claim 3, wherein said operation mechanism is composed of a first operating piece forcibly swinging said locking movable piece from said fixation released state to said fixation active state, a driving actuator for said first operating piece, a second operating piece forcibly swinging said locking movable piece from said fixation active state to said fixation released state, and a driving actuator for said second operating piece.

5. The dipping apparatus according to claim 2, wherein said locking movable piece of said positioning and fixing device is pivotally supported at said rotation base so as to be swingingly engaged with and detached from a locked member provided to said conveying traveling body, is provided with an operated portion and is juxtaposed with a spring for biasingly holding said locking movable piece in a fixation active state of being engaged with said locked member, and said operation mechanism is composed of a positionally fixed operation member acting upon said operated portion of said locking movable piece when said rotation base returns to said waiting posture and moving said locking movable piece to a fixation released state of being away from a moving path of said locked member against a biasing force of said spring.

* * * * *